Jan. 26, 1954            G. BOULET            2,667,032
REVOLVING COMBUSTION CHAMBER WITH LUBRICATION MEANS
Filed Jan. 17, 1950                                    4 Sheets-Sheet 1
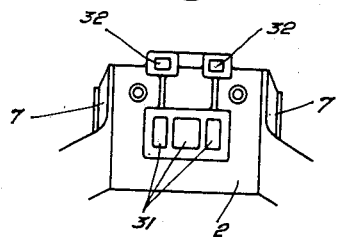
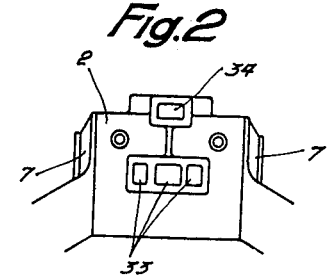
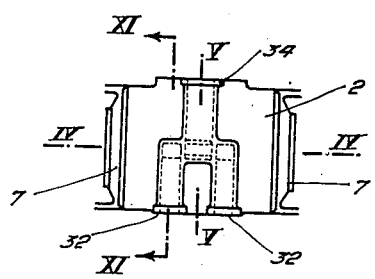
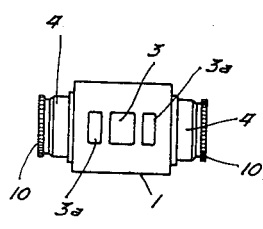
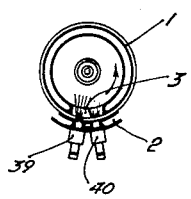
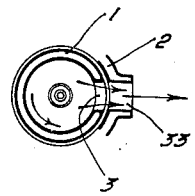
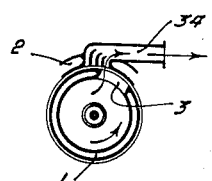
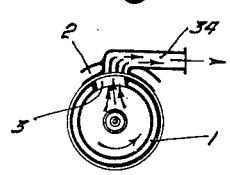
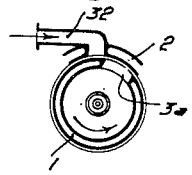
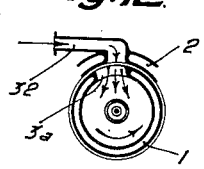
INVENTOR
GEORGES BOULET
BY
ATTORNEY Jan. 26, 1954            G. BOULET            2,667,032
REVOLVING COMBUSTION CHAMBER WITH LUBRICATION MEANS
Filed Jan. 17, 1950            4 Sheets-Sheet 2
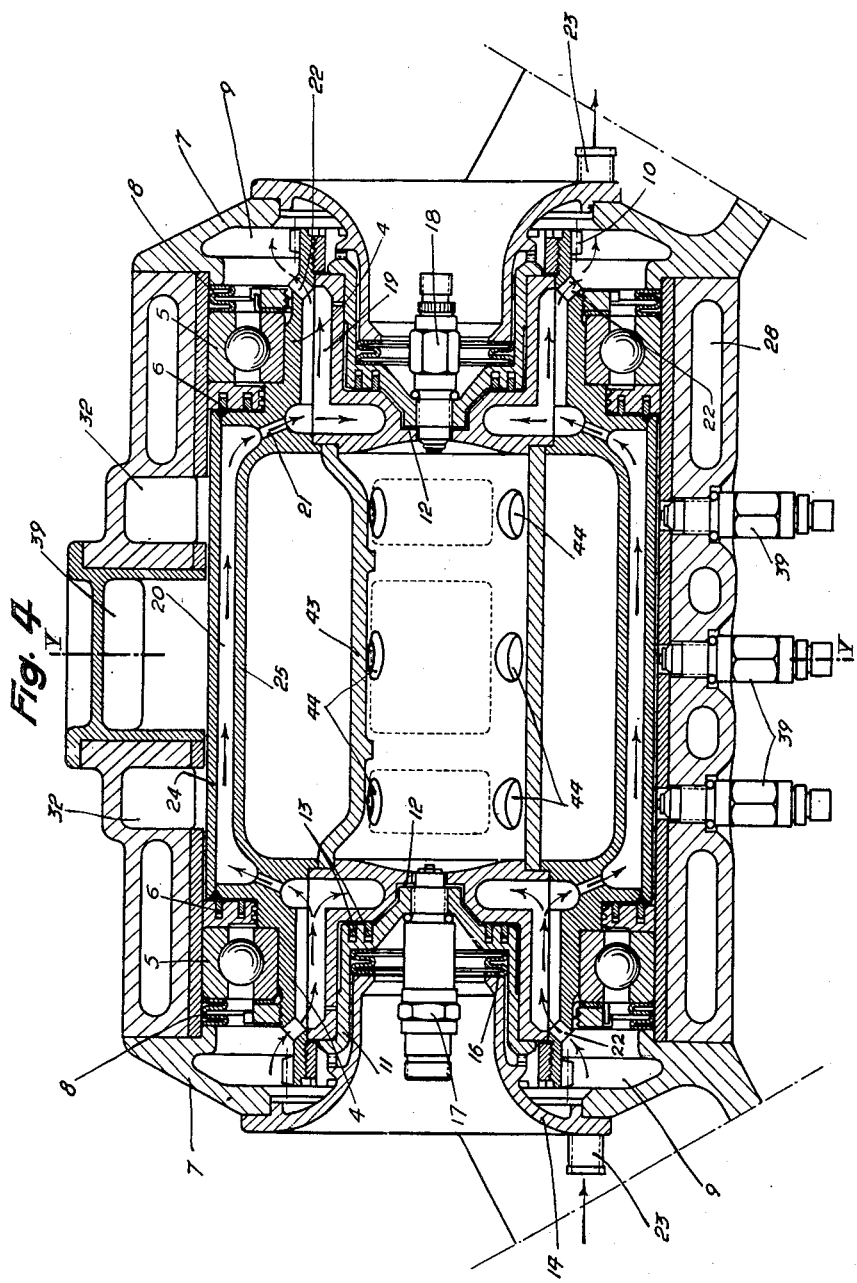
INVENTOR
GEORGES BOULET
BY *Maxwell E. Sparrow*
ATTORNEY Jan. 26, 1954  G. BOULET  2,667,032
REVOLVING COMBUSTION CHAMBER WITH LUBRICATION MEANS
Filed Jan. 17, 1950  4 Sheets-Sheet 3
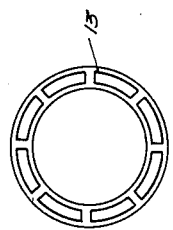
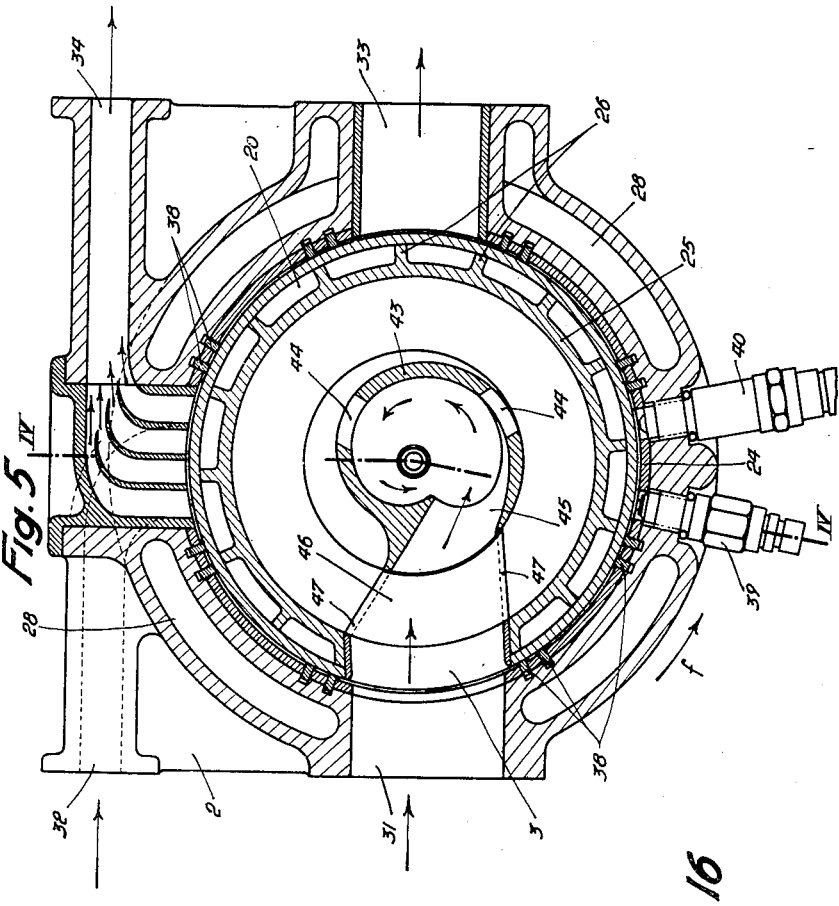
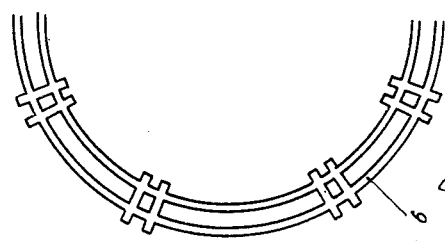
INVENTOR
GEORGES BOULET
BY Maxwell E. Sparrow
ATTORNEY Jan. 26, 1954  G. BOULET  2,667,032
REVOLVING COMBUSTION CHAMBER WITH LUBRICATION MEANS
Filed Jan. 17, 1950  4 Sheets-Sheet 4
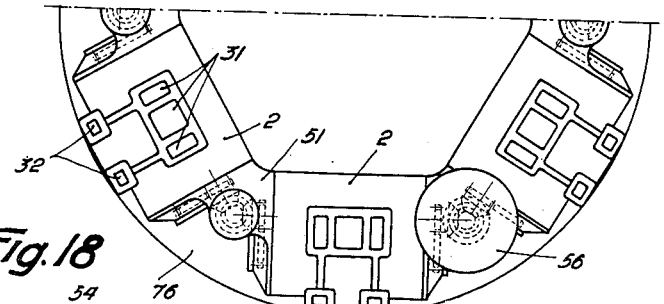
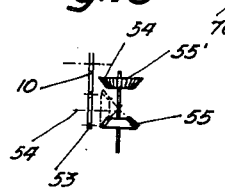
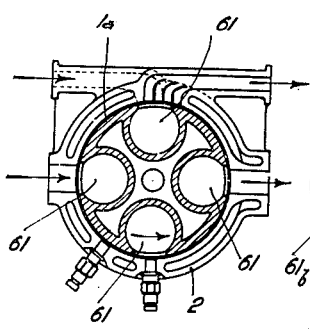
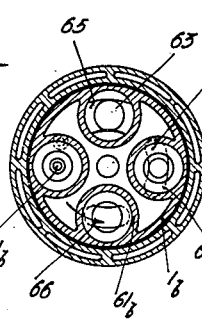
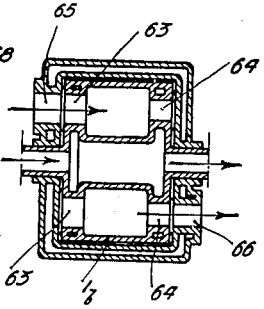
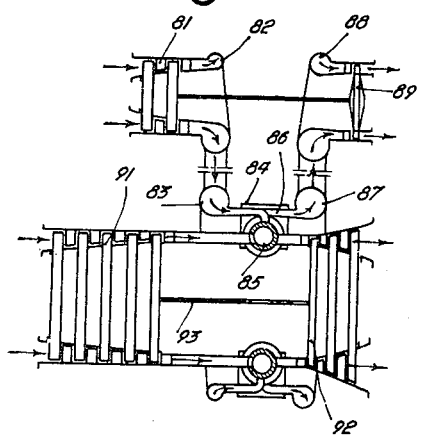
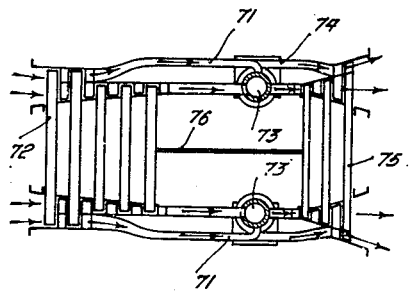
INVENTOR
GEORGES BOULET
By [signature]
ATTORNEY Patented Jan. 26, 1954

2,667,032

UNITED STATES PATENT OFFICE 2,667,032

REVOLVING COMBUSTION CHAMBER WITH LUBRICATION MEANS

Georges Boulet, Toulouse, France

Application January 17, 1950, Serial No. 138,998

Claims priority, application France January 20, 1949

8 Claims. (Cl. 60—39.08)

My invention deals with constant-volume combustion chambers such as it has been planned to employ for gas turbines, jets, etc. The combustion chamber, which forms the subject-matter of my invention, is more particularly characterized in that it is formed by an inner space of a body of revolution or so-called revolute surrounded by a similar surface of an outer jacket or casing, which body and jacket are adapted for relative rotary motion with reference to each other round their axis of revolution, so that ports, provided respectively in each of them are, periodically brought into register in order to place this space in communication with the outside and thus provide for inlet and exhaust, and means are provided through which there may be imparted to said revolute and surrounding surface a continuous relative rotary movement. Preferably this jacket is fixed, and the body is rotatable.

In a particular embodiment the inner body is provided with several cavities or cells distributed round its axis and separately connectable to the outside, thus constituting so many combustion chambers.

In another embodiment, there is a single combustion chamber which takes up the central portion of the inner body all around the axis of the latter. Whatever the embodiment preferred it may prove beneficial, in certain cases, to fit up a combustion chamber or each combustion chamber as a turbulent chamber. There is, preferably, in one of the surfaces of revolution a main exhaust port and a complementary exhaust port, intended to be connected, for instance, to an auxiliary turbine, and preferably one and a same port of the other surface of revolution cooperates consecutively with these two openings.

On the other hand, when one of the walls of revolution is fixed and is provided with openings arranged on different generating lines, there is at least one packing-ring housed in a groove of this wall between any two consecutive openings, a groove that is cut along a meridian line of this surface of revolution, and this packing-ring bears flexibly upon the outside of the rotary wall in order to keep apart these two consecutive openings in a fluidtight manner.

As examples that are in no way restrictive, the attached drawings illustrate various embodiments of the combustion chamber, that forms the subject-matter of my invention, and these various embodiments show many novel characteristic features in addition to those such as specified above.

In these drawings:

Fig. 1 is an elevational front view of a first embodiment.

Fig. 2 is an elevation view of this same chamber seen from the other side.

Fig. 3 is a corresponding plan view.

Fig. 4 is, on a larger scale, a section along the line IV—IV of Fig. 3, also along the line IV—IV of Fig. 5, that is to say through the axis of the combustion chamber.

Fig. 5 is a cross-section of the combustion chamber, along the line V—V of Figs. 3 and 4.

Fig. 6 is an outer view of the rotary body of revolution of which the inside forms the combustion chamber properly so-called.

Figs. 7 to 10 are part cross-sections, made in a diagrammatic manner, along the line V—V of Fig. 3 and illustrate various stages in the operation of the combustion chamber.

Figs. 11 and 12 are likewise diagrammatic illustrations of two other stages in the operation of the combustion chamber but are carried out along the line XI—XI of Fig. 3.

Figs. 13, 14, 15 and 16 are outside views of certain parts of the chamber illustrated in Figs. 4 and 5.

Fig. 17 is an outside view of a set-up side by side in the shape of a half-circle of three combustion chambers of the type as shown in Figs. 1 to 12.

Fig. 18 is a view of a detail of this set-up.

Fig. 19 shows, as a cross-section through the axis, a modified embodiment of the combustion chamber.

Figs. 20 and 21 illustrate respectively, as a longitudinal section through the axis of rotation and as a cross-section, another modified embodiment.

Figs. 22 and 23 finally are diagrams showing heat engines provided with sets of combustion chambers designed in accordance with the invention and scavenging devices that may be employed with these chambers.

In the embodiment illustrated in Figs. 1 to 16, the combustion chamber is formed by the inner cavity of a rotary body of revolution 1, in this case of cylindrical shape, enclosed inside an outer jacket or casing 2 (Figs. 1 to 3 and 6). This body is entirely closed with the exception of three ports arranged side by side and lengthwise cut in its cylindrical wall, namely a central port 3 with ports 3a on each side. The opposite end walls of this rotating body 1 are each provided with a large central outer journal 4 by means of which this body housed inside a boring of the casing 2 is carried there with the intervention of ball bearings 5 so that it may rotate there on itself. Fluidtight packing-rings 6, shown in greater detail in Fig. 13, are inserted between the end walls of the rotating body and the bearings 5. These packing-rings (Fig. 13) are formed by concentric rings connected together through bars arranged according to the radii, the whole being cut out from a single piece in sheets of friction metal, preferably self-lubricating. Rings and radial bars are encased in suitable grooves of an annular collar located between the bearing and the adjacent end wall of the rotary body. The bars housed in those of the grooves that are radial result in preventing the rings from turning. Springs 6a (Fig. 16) are located in the bottom of the grooves so as to thrust the packing-rings against the end walls of the rotating body 1. Each of the bearings is held in the casing 2 through a cover 7 fastened at the end of the latter with the intervention of a flexible joint 8 between cover and outer ring of the adjacent bearing in order to make up for any expansions. The cover 7 leaves inside the casing 2 a free area or chamber 9 where is housed a gearwheel 10 fitted on the outside of the journal 4. Each journal is hollowed out in its central portion and in this chambering that emerges outside and forms a kind of cup, is housed a cylindrical member 11. A labyrinth joint is provided at 12 between the head of this member 11 and that of said cup. A fluidtight packing-ring 13 formed like the packing-rings 6 is inserted in addition round the said labyrinth joint between the head of this member and the bottom of the cup of the journal piece. These packing-rings are fitted in grooves cut in the head of member 11 and springs 13a (Fig. 15) are housed in the bottom of these grooves. The member 11 is provided likewise with a central cylindrical cavity into which projects the central portion, likewise cylindrical, of the cover 7, a portion formed by an inserted part 14 in a hole of the cover 7. The member 11 is prevented from turning by the part 14 by means of teeth 15 provided respectively at the end of the member 11 and on the part 14 and that are engaged with each other over a portion only of their length in order to enable relative longitudinal movements of these two parts 11 and 14 to take place. A flexible fluidtight joint 16 intended to make up for axial expansions is inserted between the head of the central cavity of the member 11 and the end of the part 14. The member 11 may be used, as shown, as a support for a spark plug 17 or an injector 18 arranged axially of the rotating body. For this purpose, the head of the member 11 is drilled with a hole into which is fastened the spark plug or the injector of which the end projects beyond and enters into the combustion chamber through a central hole provided in the end wall of the body. The rotary body 1 is preferably, as well as its journals 4, provided with a hollow wall and the annular chamber 19 of each low wall and the annular chamber 19 of each journal is in communication with the inside 20 of the cylindrical hollow wall through holes 21 as well as with the chamber 9 through communicating holes 22. Each cover 7 carries besides an outer pipe 23 opening into the chamber 9 so that there may be thus fixed up, through outside means not shown, a cooling-fluid circulation, for instance, of silicated oil, through the end chamber 9, the holes 22 for communication of these chambers with the annular interior 19 of the journals 4, and the holes 22 for communicating with the interior 20 of the cylindrical wall of the rotary body 1, for instance as shown by the arrows on Fig. 4. The rotary body, preferably, is made in two parts of which one 24 is formed by an outer cylinder into which is threaded the other part 25 that carries the journals 4 and longitudinal outer fins 26 on which the outer cylinder forms a clasping hoop. The casing 2 likewise has internal circulation of a cooling fluid and its wall is provided for this purpose with suitable inner cavities 28 into which emerge pipes, not shown, for connecting up with outside means for circulation of a cooling fluid. On one surface, the casing 2 shows three openings 31 arranged as are the ports 3a of the rotary body 1, so that, at the time of the rotation of the body 1, the ports 3a and 3 will pass in register with the openings 31. On the same side (Fig. 1) of the casing 2 emerge furthermore, on each side of the middle crosswise plane of the casing, two channels 32. On its opposite side (Fig. 2) the casing 2 shows again three openings 33 arranged in a similar way to the ports 3 and 3a so that the latter will pass also in register with them during the rotation of the rotary body 1. On this same side emerges also another channel 34 arranged so as to be on the sole path of the central port 3 of the rotary body 1. All these openings or channels 31, 32, 33, 34 communicate on the other hand with the inside of the central boring of the casing 2 and longitudinal fluidtight packing-rings 38 are housed in longitudinal grooves of the boring and bear on the outer surface of the rotary body 1 in order to insulate these various openings from each other in a fluidtight manner. Injectors 39 or spark plugs 40, or both, may be fastened moreover on the casing 2 at suitable points of the latter.

The operation is as follows:

In the position shown in Fig. 5, the ports 3 and 3a of the rotary body 1 are respectively in register with the three openings 31 of the casing 2 that are capped by a pipe, not shown, through which flows air under high pressure derived from a compressor or mixer; this air enters, therefore, into the chamber so that the inlet stage corresponds at this position. With the rotary body revolving in the direction of the arrow f, the ports 3 and 3a pass in register with the injectors 39 then with the spark plugs 40 (Fig. 7). In this position, the injectors 39 may proceed with any injection wanted, for instance of hydrogen peroxide, amyl nitrite, etc., or injections at one and the same time of several of these products and cause ignition of the mixture by the spark plug 40, or again through the injection of a heat producing liquid. Some of the injectors 40 may be used also for injecting water. It will be observed that, under these conditions, the injection and the ignition are made at a fixed non-adjustable point of the cycle, while the axial spark plug 17 and injector 18 enable an injection and ignition to be made at a varying point of the cycle. Naturally, injection and ignition are operated in time relation with the rotation of the rotary body 1 with the help of known devices that will not be discussed here. By carrying on with its rotary movement, the body 1 brings its ports 3 and 3a opposite the openings 33 of the casing (Fig. 8) and the exhaust takes place through these openings 33 that are connected to a main turbine. The cross-sections of the openings 33 are designed in order that there is not complete exhausting, so that, when the central port 3 of the rotary body 1 comes into register with the channel 34, there takes place a complementary exhausting (Fig. 9). The channel 34 is connected to advantage with a secondary turbine. In this position, use is not made of the ports 3a but they are immediately about to come opposite the two channels 32 (Fig. 11). The latter are connected to a delivery device for fresh air that produces a scavenging of the chamber while the ports 3a pass in register with the outlets of these channels 32 in the casing (Fig. 12). During this same period the ports 3 remain opposite the channels 34 (Fig. 10), so that the scavenging air escapes through the latter. The cycle is then ended, the ports 3 and 3a again pass opposite the inlet openings 31 of the casing 2 and a fresh cycle starts.

With a view to improving and speeding up the combustion, the rotating chamber shown in Figs. 4 and 5 is fitted up as a turbulent chamber by means of a sleeve 43 with spiral cross-section, and of which the wall is drilled with holes 44. This sleeve is fastened in a fluidtight way to the two end walls of the rotary body and it is provided with a tangential inlet opening 43 (Fig. 5) positioned opposite a pipe 46 converging towards the inside of the rotary body 1 and that extends the central port 3 towards the inside. This pipe 46 is drilled with holes 47 arranged crosswise with a cross-section of the rotary body. The result is that, when the ports 3 and 3a pass in register with the air-inlet openings 31, the air coming in through the middle port 3 enters alone into the sleeve 43, while the air that goes through the side ports 3a fills the combustion chamber outside the sleeve 43. The effect produced through the shape given to the inside of the sleeve 43 is well known and will not be discussed here. At the instant of scavenging, a portion of the scavenging air circulates round the sleeve 43 while another portion goes inside the pipe 46 through the holes 47 then passes through the tangential opening 45 and enters into the sleeve 43.

When several chambers of the type as disclosed above are set together, for instance as shown in Fig. 17 where they constitute a half-ring, the cover 7 is common to two neighbouring chambers and forms portion of an end casing 51 provided with two surfaces each constituting a joint plane with the corresponding abutting end of the casing of the two chambers. Inside each of these casings 51 are two counter-gears 53 (Fig. 18) engaged respectively with gearings 10 fitted on the journals of two adjoining rotary bodies. On each shaft carrying a gear 53 is fastened a bevel counter-gear 54 and these two pinions engage with two other pinions 55, 55' keyed on each side of the point of convergence of the axes of the gearings 53, on a common shaft. On one at least of these end casings 51, preferably one of those where the exit of the cooling fluid is carried out, is fastened in a fluidtight manner an electric motor 56 with its shaft arranged at right angles to the wall on which it is fastened and connected through this wall to the common shaft of the pinions 55, 55'. In the case of a single chamber, use may be made of a similar device, with the casing 51 then being provided with a single joint face; the arrangement, moreover, may be made simpler by arranging the casing so that the motor is fastened thereto with its axis arranged in a parallel way with that of the rotary body, whereby enabling to drive directly, without the medium of bevel counter-gearings, the gearwheel 10 secured to the rotary body.

Instead of a rotary body provided with only a single combustion chamber constituted by its central portion, a rotary body may be carried out that is provided with several separate combustion chambers made up of cells arranged in the rotary body and distributed round its axis as is shown in Figs. 19 to 21. In the embodiment illustrated in Fig. 19, the casing 2a is of the same kind as the casing 2 of the embodiment as disclosed above and illustrated in Figs. 4 and 5; on the other hand, the wall bounding the hollow rotor is shaped so that there are formed four pockets or cells 61 each of which emerges at the periphery of the rotary body 1a through ports arranged as are the ports 3 and 3a as previously disclosed. As these cells are distributed round the periphery, it happens that one of them is in the filling stage, while another is at the ignition stage, a third is being exhausted and a fourth is at the scavenging period. It is then in the hollow central portion 62 of the rotary body that is carried out the circulation of a cooling fluid and there takes place, through the instrumentality of this fluid, heat exchanges between the cell where combustion takes place and those that are in the process of admission, of exhaust or scavenging. The fluid comes into this central portion 62 and leaves from there through the journal 4a of the rotary body that is drilled with an axial hole emerging inside the body 1a.

In the modified embodiment as illustrated in Figs. 20 and 21, the rotor 1b is provided again with several cells 61b but the latter no longer emerge on the cylindrical portion of the rotor that is entirely closed (Fig. 21). They are made to communicate with the outside through openings 63 and 64 arranged in the end walls of the rotary body 1b. The casing 2b, still with a double wall in order to be cooled through the circulation of a suitable fluid, is itself also drilled with openings 65 and 66 arranged respectively in its remote sides, so as to be respectively on the passage of the openings 63 and 64 in order to be used as inlet and exhaust openings. Other openings 67 and 68 possibly may be arranged likewise in these surfaces to be used respectively for a secondary exhaust and a scavenging in an absolutely similar way with that disclosed above in the case of Figs. 4 and 5.

As applied likewise to these modifications, each chamber may be designed as a turbulent chamber, for instance in the way as illustrated and disclosed above in regard to the chamber as shown in Figs. 4 and 5.

Whatever may be the design of the chamber, there is preferably again a kind of hood for covering the injectors and possibly the spark-plugs and intended to be traversed by a current of cooling air. Such a hood arrangement is shown in quite a diagrammatic way at 17 in Fig. 17, in the case of several chambers set together, where it is common to the various chambers.

The air required for the scavenging may be supplied to the chambers as shown for instance in Fig. 22 when it is drawn through a pipe system 71 from a several-stage compressor 72 feeding a set of combustion chambers 73, while the secondary exhaust and the scavenging air leaving from the passages 34 is brought through a system of pipes 74 on to the last stages of a turbine 75 of which the first stages are fed through the exhausting of the chambers 73 and that drives the compressor 72 by a shaft 76.

In the modified arrangement as featured in Fig. 23, the scavenging air is supplied by a separate compressor 81 of low pressure of which the delivery header 82 communicates with an annular header 83 connected by separate ducts 84 to the scavenging air inlet openings of the combustion chambers 85 joined side by side so as to constitute a ring coaxial with the header 83; the openings for secondary exhaust and discharge of the scavenging air from these various chambers are in the same way joined together through ducts 86 to an annular header 87 likewise coaxial with the chambers and with the header 83 and connected to the feed header 88 of an auxiliary turbine 89 on the shaft of which is fastened the compressor 81. The high-pressure feeding air is supplied to the chambers 85 by a main compressor 90 arranged in a coaxial way with the ring formed by these chambers on the other side of which is arranged a main turbine 92 on the shaft of which is fitted the compressor 91.

The walls of revolution may be made of any suitable material that is able to stand up to quite high temperatures and high pressures, or if provided with a coating that can stand high temperatures, for instance consisting of ceramics, of fritted metal, of high-temperature glass-ware, of special alloys, etc. The inlet and exhaust openings are furnished to advantage with perlite or fritted metals.

My invention, naturally, is in no way restricted to the details in execution as illustrated or disclosed. Thus, for instance, there might be more than one spark-plug arranged in the end walls of the rotary body, the spark-plugs then turning with the latter and being fed by means of a conducting ring. The combustion chamber, possibly, may be provided with neither injector nor plug arranged in the cylindrical wall of the casing but only on the sides of the latter at the end of the end walls of the rotary body or on the other hand provided with injectors and possibly plugs, inserted in this cylindrical wall. In the case of fixed internal body and revolving jacket, the injectors would be carried by the end walls of the internal body as well as the openings for the connection by means of intake of air under pressure and outlet for hot gases.

In every case, the actual shape of the surface of revolution of the internal body and of that of the jacket may vary greatly, for instance that of a cylinder with flat end walls, with dished end walls, of a sphere, etc.

Use may be made, obviously, in the chamber, that forms the object of my invention, of any kind of fuel, combustible, igneous liquids, and the heat delivery may be effected through splitting of the atom, etc.

In heat engines, where there is a set-out of several chambers, the latter may be arranged in any way suitable to the conditions to be fulfilled, for instance with their axes located in a parallel way with each other, or else, as shown, along the sides of a polygon, etc.; speaking generally, any arrangement of the axes may be put into use as for the cylinders of a combustion engine.

What I claim is:

1. In a constant-volume combustion chamber arrangement for gas turbines, jets and other heat engines, including a closed hollow body the wall of which has its outer surface in the shape of a surface of revolution, an outer shell or casing at least partly enclosing said body and having an inner wall surface closely embracing at least a part of said surface of revolution, said body and shell being supported for relative rotary motion about the axis of said surface of revolution, means for imparting a continuous relative rotation to said body and shell, ports provided respectively through said body wall and in the shell and so located that they will be brought cyclically into register by said relative rotation between body and shell, and means for cyclically developing heat within said body in time relation with said relative rotation, said casing being stationary and the body rotatable and provided with at least one hole coaxial with the surface of revolution and extending through its bottom, said arrangement further including a device having an operative part located in register with said hole in order to be capable of operation within said chamber, a support for said device, packing means around said hole between the body and said support and in fluid-tight engagement with said body and support, and connecting means connecting said casing and support together to lock the latter against rotation.

2. In a constant-volume combustion chamber arrangement for gas turbines, jets and other heat engines, including a closed hollow body the wall of which has its outer surface in the shape of a surface of revolution, an outer shell or casing at least partly enclosing said body and having an inner wall surface closely embracing at least a part of said surface of revolution, said body and shell being supported for relative rotary motion about the axis of said surface of revolution, means for imparting a continuous relative rotation to said body and shell, ports provided respectively through said body wall and in the shell and so located that they will be brought cyclically into register by said relative rotation between body and shell, and means for cyclically developing heat within said body in time relation with said relative rotation, said hollow body including an inner cylinder and an outer sleeve fitted thereon and forming a clasping hoop.

3. In a constant-volume combustion chamber arrangement for gas turbines, jets and other heat engines, including a closed hollow body the wall of which has its outer surface in the shape of a surface of revolution, an outer shell or casing at least partly enclosing said body and having an inner wall surface closely embracing at least a part of said surface of revolution, said body and shell being supported for relative rotary motion about the axis of said surface of revolution, means for imparting a continuous relative rotation to said body and shell, ports provided respectively through said body wall and in the shell and so located that they will be brought cyclically into register by said relative rotation between body and shell, and means for cyclically developing heat within said body in time relation with said relative rotation, further including a perforated sleeve disposed coaxially within the chamber and internally designed as a turbulent combustion chamber, said sleeve having its both ends secured to said body.

4. In a constant-volume combustion chamber as in claim 3, said sleeve being provided with an opening, and a duct connecting said opening to a port in the surface of revolution of the hollow body.

5. In a constant-volume combustion chamber arrangement for gas turbines, jets and other heat engines, including a closed hollow body the wall of which has its outer surface in the shape of a surface of revolution, an outer shell or casing at least partly enclosing said body and having an inner wall surface closely embracing at least a part of said surface of revolution, said body and shell being supported for relative rotary motion about the axis of said surface of revolution, means for imparting a continuous relative rotation to said body and shell, ports provided respectively through said body wall and in the shell and so located that they will be brought cyclically into register by said relative rotation between body and shell, and means for cyclically developing heat within said body in time relation with said relative rotation, said casing being stationary and the hollow body provided with a jacket, and said arrangement further including outer hollow journals axially provided on said body, bearings carried by the casing and rotatably supporting said journals, the interior of said journals being in communication with that of said jacket, and means for circulating a cooling fluid through said jacket from one journal to the other.

6. In a constant-volume combustion chamber for producing hot pressure gases, an outer stationary casing having a cylindrical bore, an externally cylindrical hollow body rotatably fitted within said bore with its wall close to that of the latter, journals axially carried by said body, bearings fitted within said bore at both ends thereof and rotatably carrying said journals, said casing being provided with holes emerging into said bore and the body with holes through its cylindrical wall, said holes in the casing and the body being so located that they will be brought periodically into register by rotation of the rotatable body, at least one cover adapted to be removably secured to said casing to cap an end of said bore, whereby wholly enclosing the rotatable body, and means adapted to rotate said body, at least one of the journals of said body having an extension projecting beyond the associated bearing into a space between said bearing and the adjacent parts of the said casing and cover, and said means adapted to rotate the body including a gear wheel keyed on said extension and a driving shaft projecting into this space.

7. In a device for producing hot pressure gases, two combustion chambers as in claim 6, so relatively positioned that their respective cylindrical holes having adjacent ends and said cover capping one end of the cylindrical bore of a combustion chamber also capping the adjacent end of the cylindrical bore of the other chamber.

8. In a constant-volume combustion chamber for producing hot pressure gases, an outer stationary casing having a cylindrical bore, an externally cylindrical hollow body rotatably fitted within said bore with its wall close to that of the latter, journals axially carried by said body, bearings fitted within said bore at both ends thereof and rotatably carrying said journals, said casing being provided with holes emerging into said bore and the body with holes through its cylindrical wall, said holes in the casing and the body being so located that they will be brought periodically into register by rotation of the rotatable body, at least one cover adapted to be removably secured to said casing to cap an end of said bore, whereby wholly enclosing the rotatable body, and means adapted to rotate said body, said body being jacketed and said journals hollow and their wall pierced with holes through which the interior of said journals is in communication with the interior of the jacket of the body on the one hand and with the space bound by said bearing and the adjacent parts of said casing and cover on the other hand, and means for circulating a cooling and lubricating fluid serially through said space, journal and jacket.

GEORGES BOULET.

References Cited in the file of this patent

UNITED STATES PATENTS

| Number | Name | Date |
|---|---|---|
| 694,090 | Clayden | Feb. 25, 1902 |
| 1,887,716 | Koch | Nov. 15, 1932 |
| 1,983,191 | Price | Dec. 4, 1934 |
| 2,445,856 | Mayer | July 27, 1948 |
| 2,504,854 | Longfellow | Apr. 18, 1950 |